United States Patent [19]
Levinstein

[11] 4,039,296

[45] Aug. 2, 1977

[54] CLEARANCE CONTROL THROUGH A NI-GRAPHITE/NICR-BASE ALLOY POWDER MIXTURE

[75] Inventor: Moses A. Levinstein, Cincinnati, Ohio

[73] Assignee: General Electric Company, Cincinnati, Ohio

[21] Appl. No.: 640,326

[22] Filed: Dec. 12, 1975

[51] Int. Cl.² .............................................. B22F 3/00
[52] U.S. Cl. ..................................... 428/553; 75/201; 75/208 R; 277/96 A; 418/178; 418/179; 428/564
[58] Field of Search ............ 418/178, 179; 277/96 A; 29/182.5, 182.3; 75/201, 208 R

[56] References Cited
U.S. PATENT DOCUMENTS

| | | | |
|---|---|---|---|
| 3,068,016 | 12/1962 | Dega | 29/182.3 |
| 3,147,087 | 9/1964 | Eisenlohr | 29/191.2 |
| 3,268,997 | 8/1966 | Miller | 75/222 |
| 3,342,563 | 9/1967 | Butts | 29/182 |
| 3,343,953 | 9/1967 | Schladitz | 75/201 |
| 3,350,178 | 10/1967 | Miller | 29/182.3 |

*Primary Examiner*—Brooks H. Hunt
*Attorney, Agent, or Firm*—Lee H. Sachs; Derek P. Lawrence

[57] ABSTRACT

An improved abradable coating particularly useful to control clearances between relatively moving members in a sealing relationship includes a base portion and an abradable coating portion which is the fusion and interaction product of a mechanical mixture of a plurality of powdered materials comprising a nickel-graphite powder and a nickel-chromium-base alloy powder. One method for making such a seal member includes applying a strippable bond coat of predominantly nickel between a base portion of the member and a subsequently thermal deposited coating.

8 Claims, 2 Drawing Figures

4,039,296

CLEARANCE CONTROL THROUGH A NI-GRAPHITE/NICR-BASE ALLOY POWDER MIXTURE

The invention herein described was made in the course of or under a contract, or a subcontract thereunder, with the U.S. Department of the Air Force.

BACKGROUND OF THE INVENTION

This invention relates to abradable clearance control coatings and, more particularly, to such coatings as are capable of operating up to about 1200° F (650° C) and are based predominantly on nickel.

The efficiency of an axial flow compressor in a gas turbine engine is at least partially dependent on inhibition of interstage leakage. If a relatively wide clearance exists between a compressor casing and a compressor rotor stage, fluid such as air being compressed can leak from a higher pressure portion to a lower pressure portion of the compressor. Therefore, evolving with gas turbine engine development has been the development of clearance control coatings to minimize interstage leakage.

Solution of such a clearance control problem is made more complex by the fact that during operation, the compressor casing and the rotating compressor blades expand or contract at different rates in an engine cycle. Therefore, one solution has been to allow the blades, rotating, stationary or both, to cut a path into a material mounted in juxtaposition with the blade tips in each stage. Materials so applied have included honeycomb, wire mesh, foamed metals and other porous structures. One such material in wide use in aircraft-type gas turbine engines is described in U.S. Pat. No. 3,342,563 — Butts, issued Sept. 19, 1967, the disclosure of which is incorporated herein by reference.

Many of the existing clearance control systems perform adequately for the type of engine in which they are applied. However, more advanced engines require improved materials having higher temperature capabilities as well as being capable of reducing wear on the tips of blades which rub an abradable coating or material.

SUMMARY OF THE INVENTION

It is a principal object of the present invention to provide an improved seal member including an abradable clearance control coating capable of operating up to about 1200° F (650° C), which allows cooperating members to abrade the coating with little if any wear on such cooperating members, and which coating resists erosion produced by airborne particles.

This and other objects and advantages will be more fully understood from the following detailed description, examples and the drawing, all of which are intended to be typical of rather than in any way limiting on the scope of the present invention.

Briefly, the powdered mixture of the present invention comprises a mechanical mixture of a plurality of powdered materials, each in the size range of about that which will pass through a 150 mesh screen to that which will be retained on a 325 mesh screen. U.S. Standard Sieve ($-150/+325$ mesh). The mixture includes a powder which comprises greater than 20% up to about 40% of a nickel-graphite powder consisting of a core of graphite and a shell of nickel such that the nickel comprises greater than about 50% and less than about 75% of the nickel-graphite powder. The balance of the mixture is a nickel-chromium-base alloy powder which can be a composite powder optionally with a shell or surface of another element. Thus, it can include amounts of other elements, some of which are aluminum and iron.

Such a mixture is used in developing a coating for a seal member in one form of the method of first cleaning a base portion of the seal member, applying a bond coat of predominantly nickel, and then flame-depositing the powdered mixture using an oxy-alkane gas, such as oxy-acetylene gas, under carburizing conditions to heat the powder in the range of about 2100° – 2300° F (1150° – 1260° C).

Resulting from the method which uses the powder associated with the present invention is a seal member which includes a base portion and an abradable coating portion produced from the fusion and interaction of the above-described powder mixture. The abradable coating portion comprises a dispersion of graphite particles and a plurality of blocky portions of a nickel-chromium-base alloy wherein Ni platelets aid in the particle-to-particle bonding. The coating portion has a density of about 3.7 – 4.2 grams per cubic centimeter. The base portion can be of any compatible material, such as the Fe-, Co-, Ni-, Ti-, Al- and Mg-base alloys, frequently used in gas turbine engines.

DESCRIPTION OF THE PREFERRED EMBODIMENTS

Figure 1:
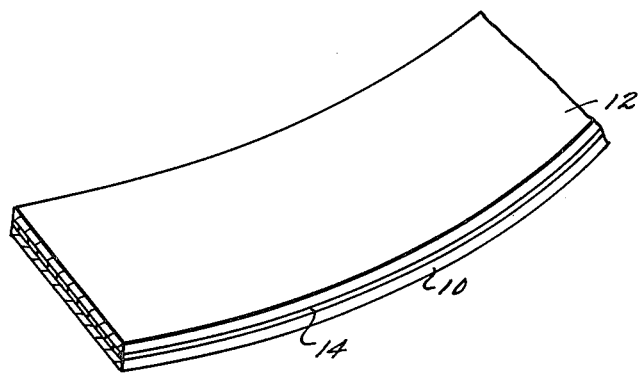
FIG. 1 is a partially sectional, perspective view of a shroud seal portion for a gas turbine engine compressor.

The search for improved clearance control coatings or materials for use with cooperating members in compressors, for example rotating blades and casings as well as stationary blades and the rotating portion of rotors, included evaluation of a wide variety of materials generated from commercially available metallic powders. For example, there are commercially available a variety of powders consisting of a core of graphite and a shell of nickel in a variety of composition ranges. The preparation and application of such coated powders, which are sometimes referred to as composite powders, are well known and widely reported in the literature, as identified in column 2 of the above-incorporated U.S. Patent. The present invention recognizes that a mechanical mixture of a plurality of powders including the nickel-chromium-base alloy powder and the metal-graphite powder, when applied by a relatively low temperature, low particle velocity combustion-type thermal deposition process, sometimes called the flame-deposition process, in which the particles are heated under carburizing conditions in the range of about 2100° – 2300° F (1150° – 1260° C), results in an improved abradable coating portion for application to a seal member. Such a combustion-type or flame-spray process is included in the subject of the concurrently filed application Ser. No. 640,325, entitled "Thermal Spraying of Particles", the disclosure of which is incorporated herein by reference. Such a combustion-type process is contrasted with the plasma-type thermal-deposition process in that significantly different microstructure results: such improved process employed with present invention showed considerably less laminar particles than those deposited by the plasma process, especially as it relates to nickel particles in connection with the present invention. The process associated with the present invention uses an oxy-alkane-type of gas, typical examples of which are oxy-acetylene gas and oxy-propane gas, applied under carburizing conditions to provide a particle temperature in the range of 2100° – 2300° F (1150° – 1260° C).

Used in one series of evaluations was a nickel-chromium base alloy composite powder, having a composition, by weight, of about 4 – 8% Al, 16 – 20% Cr, with the balance nickel and incidental impurities, the nickel-chromium alloy portion being in the core and the Al being a shell or coating on the core. One form of such a powder is marketed by Metco, Inc. of Westbury, N.Y. under the name of Metco 443 powder. This NiCr-base alloy composite powder was mixed in various proportions with a composite power having a core graphite and a shell of nickel in the proportion of about 60 weight percent nickel and about 40 weight percent graphite. In this series of examples, each of the powders was in the size range of about −150 to about +325 mesh, U.S. Standard Sieve, because it was found that a larger-size powder would result in a coating of insufficient cohesive strength and a smaller-size powder would result in too dense a coating. Te various mechanical mixtures of powders evaluated were flame sprayed onto a base or backing member of a Ti-base alloy using an oxy-acetylene gas mixture under a pressure of about 10 – 15 psi. The coating was applied to a thickness in the range of about 0.03 – 0.04 inches.

After generation of abradable coatings with a variety of combinations of such powders, the coating portions were evaluated in rubbing tests employing compressor blades having 0.025 inch thick tips. The blade tips and abradable coating material were rotated relative one to the other at the rate of about 40,000 feet/minute with a 0.02 inch set maximum depth of rub. The following Table I presents blade wear data typical of each combination of powder mixture of Metco 443 powder (443) and nickel-graphite powder (NiCg).

TABLE I

| | Ni-Base Alloy Blade | | |
| | Powder Mixture (weight percent) | | Blade Wear |
| Example | 443 | 60Ni/40Cg | (mils) |
| --- | --- | --- | --- |
| 1 | 70 | 30 | 0.8 |
| 2 | 60 | 40 | 4.2 |
| 3 | 70 | 30 | 0.1 |
| 4 | 60 | 40 | 3.5 |

As used in Table I, Ni-base alloy refers to a nickel-base superalloy, sometimes referred to as IN718 alloy, and consisting nominally, by weight, of 0.05% C, 19% Cr, 18% Fe, 3% Mo, 5% of the sum of Cb and Ta, 1% Ti, 0.5% Al with the balance essentially Ni and incidental impurities. The specimens used in the evaluation represented by Table I were pre-aged for about 5 hours at 800° F (about 425° C) It is easily seen from the typical blade wear data of Table I that 40 weight percent of the 60% Ni/40% graphite powder was excessive when mixed with a nickel-chromium base alloy composite powder represented by Metco 443 powder. It was found to result in a coating which was too low in erosion resistance after exposure at 1150° F (620° C). In addition, inclusion of about 80 weight percent of the 443 powder was found in other evaluations to result in too hard a coating and hence in too much wear. Thus, the powder form of the present invention contemplates a mechanical mixture of a nickel-graphite powder and a nickel-chromium base alloy powder in which the nickel-graphite powder comprises, by weight, greater than 20% to less than about 40% of the mixture and further, as will be shown below, the nickel comprises greater than about 50% but less than about 75% of the nickel-graphite powder. In the coating which is the fusion and interaction product of flame deposition of the mechanical mixture of such powders, the nickel-graphite provides porosity and the nickel-chromium base alloy provides oxidation resistance. It was foun that during initial rubbing, the graphite can act as a lubricant. However, after a relatively short exposure at operating conditions, the graphite becomes oxidized into a gas, resulting in the provision of additional voids or porosity in the coating structure. For example, the graphite is oxidized after about 2 hours at about 1200° F (650° C) and after about 24 hours at about 900° F (480° C).

Another series of evaluations was conducted using a mechanical mixtures of 65 – 75 weight percent Metco 443 powder and 25 – 35% of the 60% Ni/40% graphite powder. The coating was generated as described above to a thickness of about 0.04 inch using oxy-acetylene gas. The rub test described above was conducted using IN718 nickel-base alloy blades with a 1 mil/sec. incursion and a total of 15 mils of rub. Blade wear was found to be very slight and of no more than about 1 mil.

Nickel-graphite powder was evaluated in another series of tests involving a mixture of 70% Metco 443 powder and 30% of two different types of nickel-graphite powder. The following Table II presents some results of rub testing as described before.

TABLE II

| 70% Metco 443 powder - 30% NiCg powder Fe-base alloy blade material | | | | |
| | NiCg | | Blade wear | |
| Example | %Ni | %Cg | (mils) | Coating aged condition |
| --- | --- | --- | --- | --- |
| 5 | 60 | 40 | 0 | 1200° F/5 hrs |
| 6 | 75 | 25 | 6-7 | " |
| 7 | 60 | 40 | 0 | " |
| 8 | 75 | 25 | 6 | " |

As used in Table II, the Fe-base alloy blade material was an alloy, sometimes called A-286 alloy and consisting nominally, by weight, of 15% Cr, 25.5% Ni, 1.3% Mo, 2.2% Ti, 0.007% B, 0.3% V, with the balance Fe and incidental impurities.

It is easily seen from these data of Table II that a significant increase in blade wear occurs in various conditions of the applied coating when the nickel content of the nickel-graphite powder is increased as high as 75 weight percent. In addition, it has been recognized that including as low as 50 weight percent Ni provides insufficient nickel to produce the required film of nickel which bonds together the nickel-chromium base alloy powder included in the coating of the present invention. Therefore, the nickel-graphite powder of the present invention includes nickel in the range of greater than about 50% and less than about 75% by weight.

Figure 2:
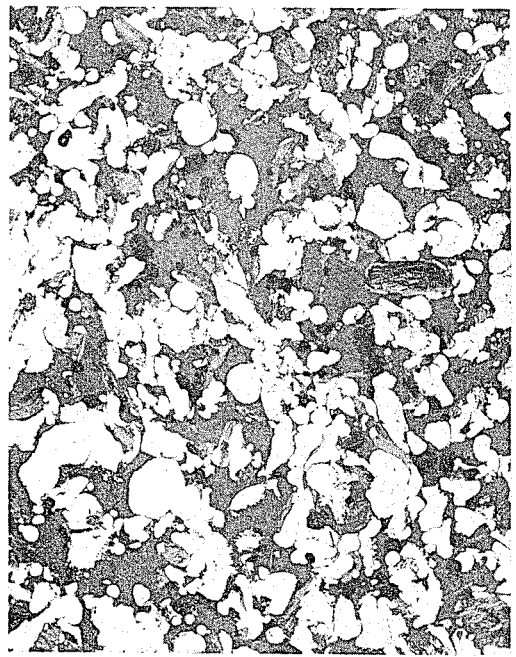
FIG. 2 is a photomicrograph at 100 magnifications of one form of the abradable coating portion of the present invention.

The article associated with the present invention is, in general, as seal member, one type of which is shown in FIG. 1 as a portion of a gas turbine engine compressor shroud, which includes a back-up member or base portion 10 and an abradable coating portion 12 secured with the base portion either directly or through an intermediate strippable portion or bond coating 14, such as is predominantly of nickel. The abradable coating portion 12 also is predominantly nickel and is the fusion and interaction product resulting from the combustion-type deposition of the powder associated with the present invention. In the coating portion from which the photomicrograph of FIG. 2 was made at 100X, the coating portion comprises prior to exposure at operating temperatures, a dispersion of the grainy appearing, dark graphite particles, a plurality of the lighter appearing blocky portions of a nickel-chromium base alloy bound with a film of nickel. The coating portion of FIG. 2 was produced as described above from a mixture, by weight, of 67.5% Metco 443 powder and 32.5% nickel-graphite powder, with the nickel comprising about 60% of the nickel-graphite powder.

Another series of evaluations employed a nickel-chromium alloy powder having a composition, by weight, of about 15 - 23% Cr, up to 14% Fe with the balance essentially Ni. One form of such an alloy, commercially available as Inco 600 alloy, has a nominal composition, by weight, of 15.5% Cr, 8% Fe with the balance essentially Ni. The above-described blade wear tests were conducted with the same relative benefit but with slightly more blade wear.

As was mentioned above in connection with FIG. 1, the seal of the present invention can include an intermediate portion or metallic bond coating 14 between the base portion 10 and the abradable coating portion 12, the bond coat being strippable with a chemical solution that has substantially no adverse effect on the material of the base portion. In one series of examples, such as intermediate strippable portion was a bond coating of Ni applied by flame spraying prior to, and in the same manner as, the abradable coating. An intermediate bond coating in the range of about 4 - 8 mils generally is adequate for its intended purpose of allowing removal of the abradable portion, such as for repair of a seal by replacement of the abradable portion. For example, the above-described abradable portion of FIG. 1 was stripped from the base portion by dissolving the oxy-acetylene flame-sprayed Ni intermediate bond coating in an aqueous solution of about half HNO₃ in about ½ - 1 hour at about 175° - 200° F (about 80° - 95° C).

The present invention has been described in connection with specific examples and embodiments. However, it will be understood and appreciated by those skilled in the arts involved that the present invention is capable of variations and modifications, depending upon the particular application desired, without departing from the scope of the invention. It is intended to define such scope by the appended claims.

What is claimed is:

1. A seal member including:
   a base portion; and
   an abradable coating portion which is the fusion and interaction product of a mixture comprising, by weight:
   i. greater than about 20% to less than about 40% of a nickel-graphite powder consisting essentially of a core of graphite and a shell of nickel, the nickel comprising, by weight, greater than about 50% and less than about 70% the nickel-graphite powder; and
   ii. the balance a nickel-chromium base alloy powder;
   the coating portion secured with the base portion and comprising a dispersion of nickel-coated graphite particles, and a plurality of blocky particles of a nickel-chromium alloy bound primarily with platelets of nickel,
   the coating portion having a density of about 3.7 - 4.2 grams per cubic centimeter.

2. The seal member of claim 1 which includes, in addition, a bond coat intermediate and bonded with each of the base portion and the abradable coating portion, the bond coat being of a material which is strippable with a chemical solution which has substantially no adverse effect on the base portion.

3. The seal of claim 2 in which the bond coat is essentially Ni.

4. The seal of claim 2 in which the base portion is an alloy based on an element selected from the group consisting of Fe, Co, Ni, Ti, Al and Mg.

5. The seal of claim 1 in which the nickel-graphite powder in the mixture consists essentially of, by weight, 55° - 65% nickel with the balance graphite.

6. The seal of claim 5 in which the nickel-chromium base alloy powder in the mixture is a composite powder comprising a core of NiCr alloy and a shell of up to about 8 weight percent Al.

7. The seal of claim 6 in which the composite powder in the mixture consists essentially of, by weight, 4 - 8% Al, 16 - 20% Cr, with the balance Ni and incidental impurities.

8. The seal of claim 5 in which the nickel-chromium base alloy powder in the mixture is a NiCrFe alloy consisting essentially of, by weight, 15 - 23% Cr, up to about 14% Fe, with the balance Ni and incidental impurities.

* * * * *